United States Patent

Coeppert

[11] 3,722,322
[45] Mar. 27, 1973

[54] SPEED CONTROL DEVICE

[76] Inventor: Erwin Coeppert, 3306 Monarch Drive, Racine, Wis. 53406

[22] Filed: May 5, 1971

[21] Appl. No.: 140,362

[52] U.S. Cl. .................................................. 74/675
[51] Int. Cl. ................................................F16h 37/08
[58] Field of Search ..............................74/675, 803

[56] References Cited

UNITED STATES PATENTS

| | | | |
|---|---|---|---|
| 3,295,395 | 1/1967 | Willard | 74/675 |
| 2,422,343 | 6/1947 | Duer | 74/675 |
| 2,745,297 | 5/1956 | Andrus | 74/675 |
| 2,969,696 | 1/1961 | Fraga | 74/675 |

*Primary Examiner*—C. J. Husar
*Attorney*—Thomas A. Hauke

[57] ABSTRACT

A speed control device having a first gear member and a second gear member and including an operable means to connect the first gear member and the second gear member together for rotation in the same direction in a manner that the speed of the slowest gear member will determine the speed of the other gear member.

4 Claims, 5 Drawing Figures

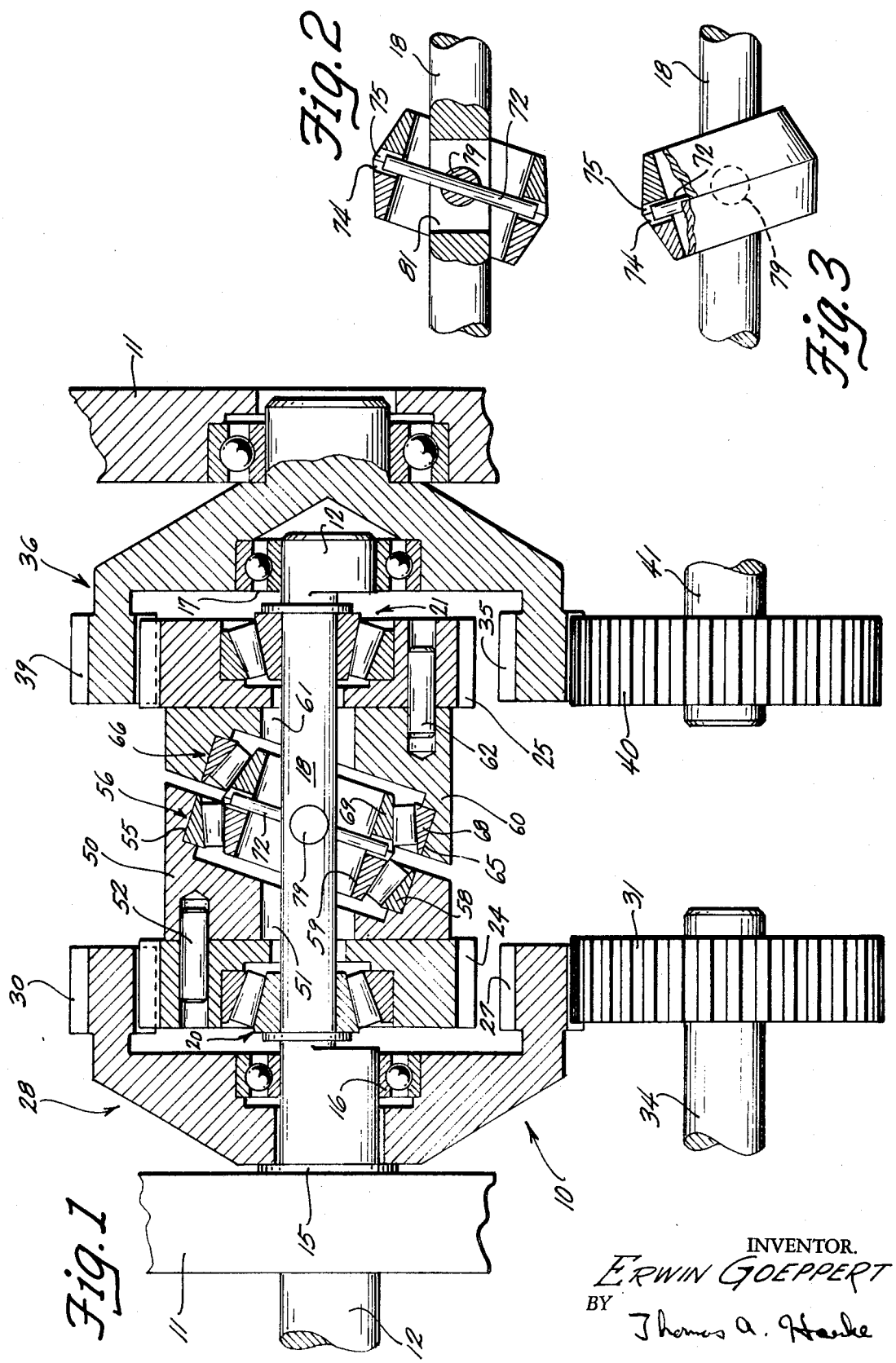

INVENTOR.
ERWIN GOEPPERT

SPEED CONTROL DEVICE

BACKGROUND OF THE INVENTION

Prior to this invention, reverted epicyclic transmission having an input power means and a speed control input means have had the problem of speed control. This is due to the fact that when the torque on the output shaft created by the load is greater than the torque applied to the input means of the transmission, it will cause the undesirable result of having the speed control input means turn at the speed dictated by the speed of the output means.

SUMMARY OF THE INVENTION

The invention disclosed herein overcomes this and other problems associated with the prior art reverted epicyclic transmissions in that the speed of the output shaft is determined solely by the input side of the transmission.

According to the present invention, the speed control device includes a shaft which rotatably supports a first gear and a second gear. A pair of cam members are interposed between the first and second gears whereby a locking of the first and second gears together may be effected in a manner that for the gears to turn they must both turn in the same direction and at the speed of the slowest rotating gear.

BRIEF DESCRIPTION OF THE DRAWINGS

FIG. 1 is a front elevation of a reverted epicyclic gear train incorporating the features of the present invention;

FIG. 2 is a view illustrating one extreme position of the locking pin and the inner races of the bearing assemblies;

FIG. 3 is a view illustrating the other extreme position of the locking pin and the inner races of the bearing assemblies;

DESCRIPTION OF THE PREFERRED EMBODIMENT

Figure 4:
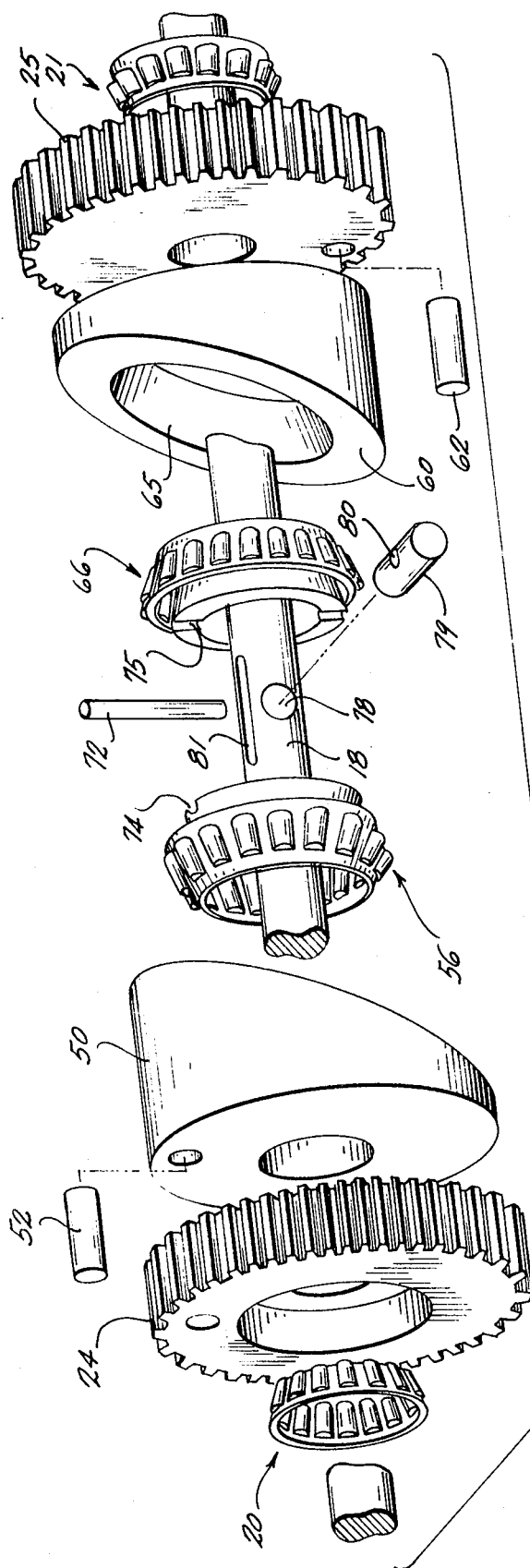
FIG. 4 is an exploded perspective view of the invention.

Referring now to FIG. 1, there is shown therein a variable speed reverted epicyclic transmission 10, operably disposed within a housing 11. A power input shaft 12 is journalled within the housing 11 in bearings 15, 16 and 17. The power input shaft 12 has a portion 18 which is of reduced diameter having its axis offset from the axis of the power input shaft 12 so that the reduced portion 18 acts as an eccentric drive shaft upon rotation of the power input shaft 12. The reduced shaft portion 18 supports bearings 20 and 21, the outer races of which receive gears 24 and 25, respectively. Gear 24 is adapted to intermesh with an internal gear portion 27 of a driving gear 28. The driving gear 28 is rotatably carried by the bearing 16 which is disposed on the power input shaft 12. Gear 28 is formed with an external gear portion 30 which is intermesh with a control input gear 31. Gear 31 is fixedly secured to a speed control input shaft 34 which is rotatably journalled through the housing 11 and is connected outside the housing to a variable speed control motor (not shown) in a well-known manner.

Gear 25 is adapted to intermesh with an internal gear portion 35 of a driving gear 36. The driving gear 36 is rotatably carried by the bearing 17 which is disposed on the power input shaft 12. Gear 36 is formed with an external gear portion 39 which is intermesh with an output gear 40. Output gear 40 is fixedly secured to an output shaft 41 which is rotatably journalled through the housing 11 and is connected outside the housing 11 to the load.

As shown in FIG. 1, a cam member 50 having an axial bore 51 is secured by pins 52 (only one is shown) to the gear 24. A counterbore 55 is formed, within cam member 50, on an axis which intersects the axis of the axial bore 51. Supported within counterbore 55 is a bearing assembly 56 comprised of an outer race member 58 and an inner race member 59. Bearing assembly 56 rotatably supports the cam member 50 as it rotates in unison with the gear 24. A second cam member 60 having an axial bore 61 is secured by pins 62 (only one shown) to the gear 25. A counterbore 65 is formed, within cam member 60, on an axis which intersects the axis of the axial bore 61. Supported within the counterbore 65 is a bearing assembly 66 comprised of an outer race member 68 and an inner race member 69. Bearing assembly 66 rotatably supports cam member 60 as it rotates in unison with the gear 25. The inner race member 59 of cam member 50 and the inner race member 69 of cam member 60 are prevented from rotating relative to the reduced shaft portion 18 by means of a pin 72 which is pivotly secured to reduced shaft portion 18. The pin 72, as shown in FIGS. 1 and 4, is disposed to engage a semi-circular recess 74 formed within inner race member 59 and a semi-circular recess 75 formed within inner race member 69.

Figure 5:
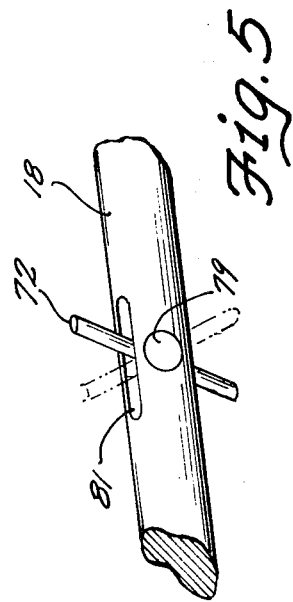
FIG. 5 is a view illustrating the axial path of the locking pin.

The connection of pin 72 to reduced shaft portion 18 is illustrated in FIG. 4. A bore 78 is formed within reduced shaft portion 18 and is adapted to receive a bushing 79. A bore 80 is formed within bushing 79 and is adapted to snugly receive the pin 72. An elongated slot 81 is formed in reduced shaft portion 18, having its major axis at right angles to the axis of bore 78. As shown in FIG. 5, the pin 72 is inserted through the slot 81 and the bore 80 of bushing 79. The pin 72 is free to move in the elongated shot 81 in a pivotable motion as illustrated in FIG. 5 by the dotted and solid lines showing the extreme pivotable position of pin 72.

As the gears 24 and 25 rotate about reduced shaft portion 18, their respective cam members 50 and 60 will rotate therewith. The cam members 50 and 60 in rotating will effect their respective inner races 59 and 69 to move laterally about bushing 79. Although the inner races 59 and 69 will move laterally about bushing 79, they are held from rotating about reduced shaft portion 18 by the pin 72. Due to the eccentric path of travel of the cam member 50 and 60 as they rotate about the reduced shaft portion 18, the inner races 59 and 69 are moved laterally in a wobble like motion. FIGS. 2 and 3 show the extreme positions that the inner races 59 and 69 will take as the bearing assembly 66 rotates about reduced shaft portion 18.

Assume that at the initial movement of gears 24 and 25 the gears and their associated cam members 50 and 60 are in the position as depicted in FIG. 2. As the cam members 50 and 60 rotate 180°, the inner races 59 and 69 will move laterally in a leftward direction to the position as illustrated in FIG. 3. As the cam members rotate another 180° the inner races 59 and 69 will again move to the position as depicted in FIG. 2.

In order to clearly understand the principles of the invention, the interaction of the various members of the speed control device 10 will be described under a given condition. Let us assume that the external load forces on the output shaft 41 are such that they will try to effect the clockwise rotation of output gear 41, as viewed from the left in FIG. 1, at a higher rotational speed than that of the speed control input gear 31. Gear 25 through gear 36 will inturn, try to rotate clockwise as viewed from the left in FIG. 3, at a higher speed than that at which the gear 24 through gear 28 is being driven. This will be prevented from happening by the interaction of cam members 50 and 60. As gear 25 attempts to effect the rotation of gear 24 at a speed greater than which it is being driven by the input speed control gear 31, a rotational force is applied to cam member 60. This force will try to rotate cam member 60 in a clockwise movement, as viewed from the left in FIG. 1, at a higher speed than cam member 50. Cam member 60 being afixed to rotate with gear 25 will rotate about the axis of the reduced shaft portion 18. However, the inner race 69 being disposed within counterbore 65 of cam 60 at an angle which innersects the axis of the reduced shaft portion 18 is prevented from rotating about the axis of the reduced shaft portion 18 by pin 72. Therefore, the rotational effect of cam member 60 will be imparted to its inner race 69 to effect a lateral displacement of the inner race 69. As the inner race 69 is displaced laterally towards the inner race 59 the two adjacent faces of inner race 69 and inner race 59 will move into wedging engagement and the laterally displacing force which has been imparted to inner race 69 will be imparted to inner race 59.

Since inner race 59 is also prevented from rotating about the axis of reduced shaft portion 18 by operation of the pin 72, it will also be displaced laterally in the same direction that inner race 69 is being displaced. Since gear 24 and its cam member 50 is being positively drive by a variable speed control motor (not shown) through gears 31 and 28, the force of the inner race 59 against its respective cam member 50 will act as a brake and will result in a developing force in the opposite direction which opposed the force in the leftward direction as viewed in FIG. 1. Thus a braking action on the gear 25 is experience which maintains the output gear 40, through gear 36 at the desired rotational speed.

Although the illustrative embodiment of the invention has been described in considerable detail for the purpose of disclosing a practical operative structure whereby the invention may be practiced advantageously, it is to be understood that the particular apparatus described is intended to be illustrative only and that the novel characteristics of the invention may be incorporated in other structural forms without department from the spirit and scope of the invention as defined in the subjoined claims.

The principles of this invention having now been fully explained in connection with the foregoing description.

I hereby claim as my invention:

1. A speed control device comprising:
   a shaft;
   a first gear rotatably mounted on said shaft;
   a second gear rotatably mounted on said shaft;
   a first cam member having an axial bore secured to said first gear;
   a second cam member having an axial bore secured to said second gear;
   a first bearing assembly disposed in said axial bore of said first cam member;
   a second bearing assembly disposed in said axial bore of said second cam member; and locking means secured to said shaft operable to connect said first gear and second gear together for rotation in the same direction and at a rate determined by the rotation of the slowest gear.

2. A speed control device according to claim 1 wherein each of said first and second bearing assemblies comprises:
   an outer race engaged with said axial bore of same cam members; and
   an inner race rotatably mounted in said outer race wherein said locking means is secured to said inner races to prevent the inner races from rotating around said shaft effecting said first and second bearing assemblies to wobble upon the rotation of said first and second gears.

3. A power transmitting device according to claim 2 wherein said locking means includes:
   a first bore in said shaft;
   a first pivot pin rotatably secured in said first bore;
   a second bore in said shaft located 90° from said first bore; and
   a second pivot pin secured in said second bore and connected to said first pivot pin and said inner races of said first and second bearing assemblies.

4. A variable speed transmission unit comprising:
   a first input drive means;
   a second input speed control drive means;
   an output drive means adopted to receive the input from said first and second drive means;
   a first gear connected to said second input means;
   a second gear connected to said output drive means;
   a first cam member secured to said first gear;
   a second cam member secured to said second gear, and means operable to effect the engagement of said first and second cam members effecting the connection of said first and second gears for rotation in the same direction and at a rate determined by the rotation of the slowest gear.

* * * * *